3,509,605
SLIDABLE FASTENING MEANS BETWEEN RELATED MEMBERS
Philip J. More, Chattanooga, Tenn., assignor to General Electric Company, a corporation of New York
Filed Sept. 10, 1968, Ser. No. 758,844
Int. Cl. F24c 15/10
U.S. Cl. 24—73                                             6 Claims

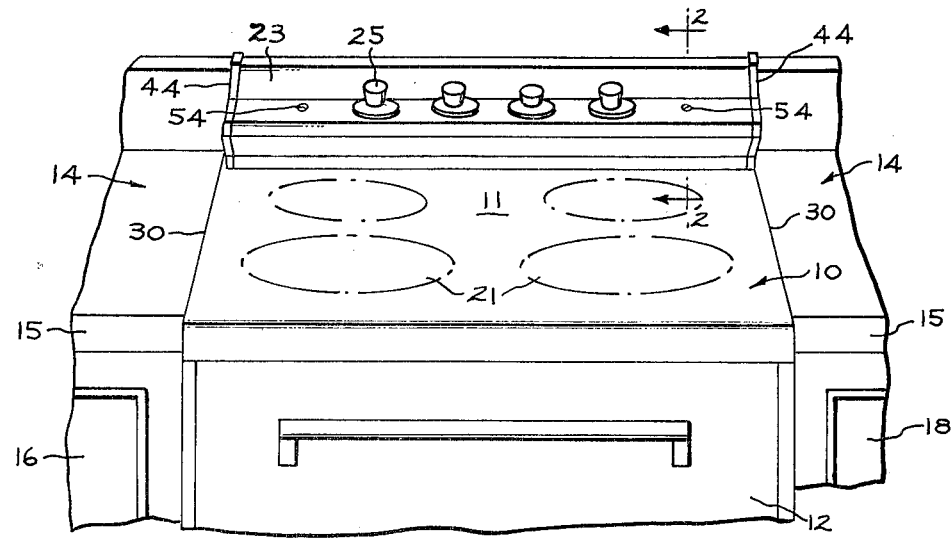
FIG. 1
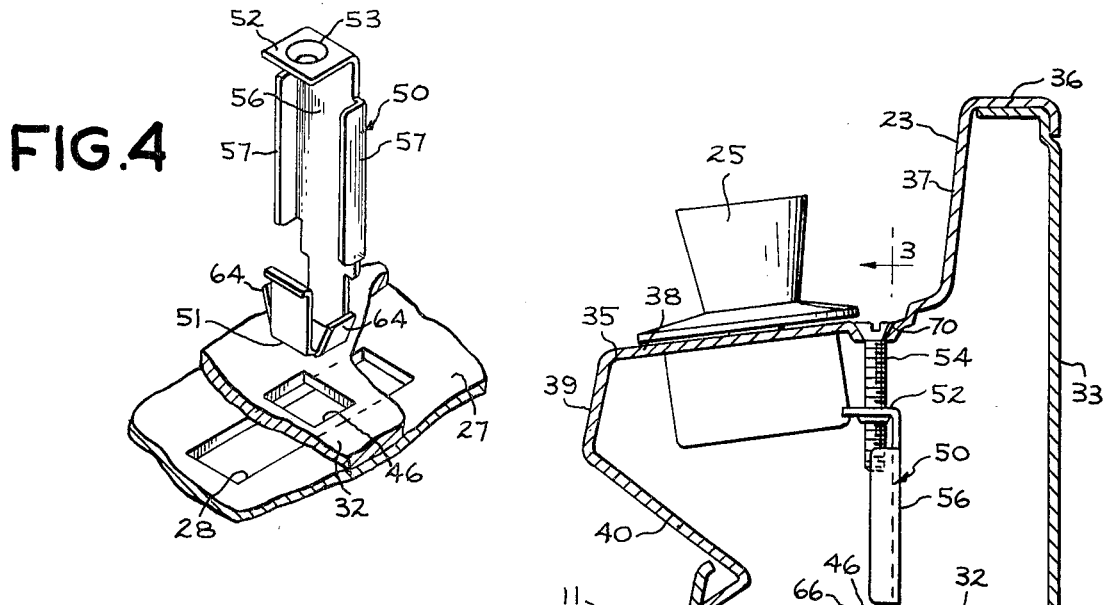
FIG. 4
FIG. 2
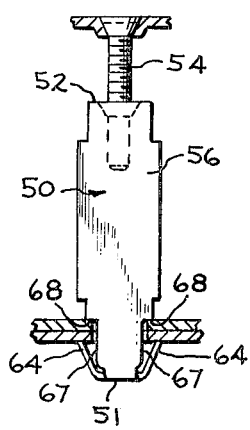
FIG. 3
INVENTOR.
PHILIP J. MORE
BY Richard L. Cash
HIS ATTORNEY United States Patent Office 3,509,605
Patented May 5, 1970

ABSTRACT OF THE DISCLOSURE

The present invention relates to cooking appliances in general and adjustable fastening means in particular between two members where one member is a fixed member and the other member is adapted to be mounted to the first member. The fastening means is a quick-connect fastening means assembled with the second member, and they move relative to the first member, but cannot easily be separated therefrom. Screw means are combined with the adjustable fastening means for locking the second member in place on the first member.

---

The present invention is useful in a domestic cooking appliance that is adapted to be built into a kitchen counter structure, where the appliance is furnished with a control housing or backsplash that overlies the back edge of the appliance, and there is an adjustment means for varying the front-to-back position of the control housing with respect to the appliance.

This invention shows a first supporting member having a thin wall with an elongated slot therein, and a second member having walls forming a box-like housing where the housing is seated on the wall of the other member. There is a small opening in the bottom of the housing in alignment with the elongated slot in the thin wall of the other member. The invention relates to a sheet metal fastener extending through said opening in the bottom of the housing and into said slot in the supporting member, where the fastener has snap-in finger means engaging the underside of the supporting member. The fastener also has shoulder means engaging the edge of the opening in the housing, thereby holding the two members together but allowing relative sliding movement therebetween as the fastener moves in the slot. Screw means extend through the top of the housing and connect to the fastener for applying a pulling force on the fastener to lock the fastener relative to the supporting member.

CROSS-REFERENCE TO RELATED APPLICATION

The present invention is a recent improvement over the invention in my copending application Ser. No. 550,186 entitled "Electric Cooking Appliance with Adjustable Controls Housing," which was filed in the Patent Office on May 16, 1966, and is assigned to the same assignee as is the present invention and is now Patent No.3,422,-812 issued Jan. 21, 1969. In my previous application, I also disclosed a cooking appliance adapted for installation in a counter having a horizontal working surface, wherein a rectangular cooking top is adapted to be secured in an appropriate space in the counter top. A pair of spaced, aligned, parallel slots were formed in the cooking top near the back thereof, extending in a front-to-rear direction. Extending vertically upwardly through each slot above the cooking top was a female threaded member which was horizontally slidable in the slot, but was not otherwise movable. The female threaded member then used was a machined part with internal threads at both ends for receiving a bottom screw member for fastening the threaded member in place, in addition to a top screw member which extends through the top wall of the backsplash of the cooking appliance for engagements in the threaded member 25.

BACKGROUND OF THE INVENTION

Cooking appliances, such as a drop-in cooktop for surface cooking, are often built into kitchen counters. In such installations, a rectangular section of the counter, including the full depth thereof, is removed. The cooking appliance is then installed in the opening thus formed and is either supported from the edges of the opening in the counter structure or is incorporated as part of a slide-in range having an oven located beneath the cooktop and perhaps a drawer space beneath the oven. Most standard cooktops have an upstanding hollow control housing or backsplash at the rear of the cooktop. It is conventional practice to insure that, where a kitchen wall abuts the rear of the counter, the cooktop is placed with the backsplash flush against the wall.

While the standard depth for kitchen counters is 25 inches from the front edge of the counter to the back edge thereof, this is a variable figure. Many such counters measure 24 inches, or even slightly less. This has posed a problem for the manufacturer of built-in cooking appliances since the front of the appliance should be at least coextensive with the front of the counter, and the blacksplash at the rear should be entirely flush against the wall, that is, coextensive with the back edge of the counter, or at a preselected distance from the back of an "island" counter installation.

The backsplash contains a control panel on the front and/or top surface thereof and the control components and the maze of lead wires connecting them are hidden within the hollow housing of the blacksplash and it is important that the backsplash be front-serviceable by the appliance serviceman or handy home owner so as to avoid pulling out the range or cooktop when service is required. Hence, the ease of detaching the blacksplash from the cooktop is of importance, as well as the ease of reattaching and adjusting the backsplash in place once the appliance is again serviceable.

The principal object of the present invention is to provide a slidable fastening means for adjustably connecting a first member to a second member where the fastening means may be snapped into place without the use of special tools for ease of assembly.

A further object of the present invention is to provide a slidable fastening means between two separate members with the ability of the fastening means to be snapped into place, and adjustable screw means for locking the fastening means and the two members in place.

A still further object of the present invention is to provide a snap-in fastening means for the backsplash of a cooktop, where the fastener is substantially rigid once it it snapped into place so that when the locking screw member is fed through the top of the backsplash it is possible to align the screw with the fastener without difficulty.

SUMMARY OF THE INVENTION

The present invention, in accordance with one form thereof, relates to a slidable fastening means for adjustably connecting a first member to a second member. The first member includes a thin wall with an elongated slot formed therein, while the second member has walls forming a hollow housing. This housing is seated on the first member over the slot. The bottom wall of the housing has a small opening in alignment with the slot. A sheet metal fastener may be forced through the opening and into the slot. The fastener has finger means engaging the underside of the first member, as well as shoulder means engaging the edge of the opening in the second member to permanently fix the fastener in the opening of the second member, while permitting the fastener to move lengthwise in the slot. One wall of the hollow housing includes a screw opening and there are screw means extending through the screw opening and adjustably connected to the fastener for applying a pulling force on the fastener to lock the fastener and hence the second member relative to the first member.

BRIEF DESCRIPTION OF THE DRAWINGS

My invention will be better understood from the following description taken in conjunction with the accompanying drawings and its scope will be pointed out in the appended claims.

FIGURE 1 is a fragmentary front view in perspective of a domestic cooking range embodying my invention shown positioned in a kitchen counter.

FIGURE 2 is a side cross-sectional elevational view through the backsplash at the rear of the range taken on the line 2—2 of FIGURE 1 through one of the fastening means for the backsplash to the cooktop of the range, and showing the fastening means as a snap-in sheet metal fastener for attaching the backsplash to the top of the cooktop and then locking the backsplash in place by means of a screw extending down through the top wall of the backsplash into the fastener.

FIGURE 3 is a rear view of the fastening means of the present invention taken on the line 3—3 of FIGURE 2 and best showing the nature of the resilient finger members at the bottom of the fastening means which are capable of springing through the opening in the bottom of the backsplash and through the slot in the top of the cooktop and then expanding to engage the underside of the top surface of the cooktop and thereby fasten the backsplash to the cooktop permitting only sliding movement in a front-to-rear direction.

FIGURE 4 is an exploded view in isometric projection of the sheet metal fastener of the present invention showing the relation of the size and shape of the small opening in the bottom wall of the backsplash and the elongated slot in the top wall of the cooktop.

DESCRIPTION OF THE PREFERRED EMBODIMENT

Referring in detail to the drawing and in particular to FIGURE 1 there is shown a one-piece built-in range 10 provided with a top cooking surface 11 and an underlying oven (not shown) that has a front-opening access door 12. The reason that the oven is not visible is that the range 10 is shown in its assembled position as being built into or between separated sections 14, 14 of a kitchen counter having a counter top 15 supported by an underlying cabinet structure 16 with front-opening cabinet doors 18. Such a range is identified as a one-piece built-in range to distinguish it from built-in range components where the oven is separated from the cooktop and is usually built into a wall structure, and the cooktop is a drop-in or slide-in cooktop that fits into a cutout in the counter top.

The cooking surface 11 is provided with a plurality of surface heating means 21 which, in the case of an electric range would be coils of metal sheathed resistance heating elements, and in the case of a gas range, would be gas burners. The present invention is not limited to a cooking appliance comprising a combined cooktop and oven. It would also be applicable if the appliance were merely a cooktop, and no oven were joined with the cooktop.

A hollow control housing 23 is adapted to be mounted to overlie the back edge of the cooktop 11. Such a control housing is known in the art as a backsplash, and it is designed to contain most of the control components for the range such as multiple position selector switches or control valves 25 for the surface heating means 21. Other examples of the control components that would be assembled in the backsplash are an oven selector switch, oven thermostat, oven timer, as is well known in this art. Only a representative number of such control components have been shown for purposes of simplicity in order to give the major emphasis to the present invention separate and apart from the standard range construction.

The present invention is probably best understood from the showing of FIGURE 2. The cooktop 11 is of sheet metal construction and it has a thin metal top wall 27 that is provided with an elongated rectangular slot 28 adjacent each of the two rear corners of the cooktop 11 and extending in a direction front-to-rear of the cooktop or in other words generally parallel with the opposite side edges 30 of the cooktop 11. This rectangular slot 18 is best illustrated in the fragmentary exploded view of FIGURE 4.

The backsplash 23 is a hollow sheet metal housing having a bottom wall 32, back wall 33 and a sculptured top and front walls 35 which include several angularly related surfaces starting with a topmost surface 36, a downwardly inclined surface 37, a generally horizontal stepped surface 38 from which the control components 25 are supported, a frontmost generally vertical surface 39, and a rearwardly inclined lower surface 40 terminating with the front edge of the bottom wall 32 as at 42. An end cap 44 is shown at each side of the backsplash 23 for closing the housing and forming a decorative trim.

The bottom wall 32 of the backsplash 42 is formed with a small, generally rectangular opening 46 directly beneath the screw 54 to overlie each elongated slot 28 adjacent the two rear corners of the cooktop 11, as is best seen in FIGURE 4. The backsplash 23 is adapted to be seated on the cooktop 11 across the rear edge thereof. The back wall 33 of the backsplash is provided with removable cover plates (not shown) or the like for gaining access to the interior of the backsplash for installing and servicing the control components 25. In the home, the backsplash would be disconnected from the cooktop 11 and folded down on its face for reaching the removable cover plates and entering the back of the control housing.

The present invention is centered around a slidable fastening means 50 of elongated sheet metal form which has a lower supporting end 51 and an upper locking end 52 formed over into a tab that includes a threaded opening 53 for receiving a locking screw member 54. The two ends 51 and 52 of the fastener 50 are connected by an elongated shank 56 of generally flat construction which is reinforced by a folded-over flange 57 at each side thereof to result in a partial channel-shaped transverse cross-section. The channel-shaped cross-section is only partial because the two parallel flanges 57 stop short of both the lower and the upper ends 51 and 52 respectively of the fastener.

Considering the lower supporting end 51 of the fastener 50 and looking particularly at FIGURE 2, this end is of generally U-shape having a flat base or bight portion 60, and one leg 61 of the U formed as the lower end of the shank 56. The opposite leg 62 is formed as a free or vertical cantilever leg that is generally parallel with the first leg 61. Looking at FIGURE 4, each side of the bight portion 60 of the lower supporting end of the fastener 50 between the legs 61, 62 is provided with a resilient finger 64 which rises upwardly at a diverging angle. On the assembly line, the worker reaches into the rear of the backsplash and forces the fastener 60 into place as the two spring fingers 64 are adapted to snap through the opening 46 in the bottom wall 32 of the backsplash as well as through the slot 28 in the top wall of the cooktop 11 and to spring outwardly to engage the underside of the top wall 27, as is best seen in FIGURE 3.

Notice in FIGURE 2 that the free leg 62 at the bottom of the fastener 50 rises higher than the resilient fingers 64. The top edge 66 of the free leg 62 is folded slightly horizontally to form a shoulder 66 for engaging the top surface of the edge of the small opening 46 in the bottom wall 32 of the backsplash. In a similar manner the first leg 61 of the U-shape formation at the bottom end of the fastener 50 is provided with an undercut 67 in each of its sides as is best seen in FIGURE 3 to form shoulders 68 in the same horizontal plane as shoulder 66 of the free leg 62 again for engaging the top surface of the opposite edges of the small opening 46 in the bottom wall of the backsplash.

Thus the assembly worker will be furnished the backsplash 23 with most if not all of the control components 25 preassembled therein, and he will place the backsplash 23 across the rear edge of the cooktop 11. Then he will reach into the interior of the backsplash and by hand force the lower end of the fastener 50 through the openings 46 in the bottom of the backsplash and the slot 28 in the cooktop until the resilient fingers 64 of the fastener spring outwardly as is best seen in FIGURE 3, and this forms a permanent attachment between the backsplash 23 and the cooktop 11. However, it is possible to horizontally adjust the backsplash relative to the cooktop 11 by grasping the backsplash at the opposite sides and moving it either forwardly or rearwardly, since the fingers 64 do not bite into the underside of the top wall 27 of the cooktop 11 and are free to slide therewith.

Once the proper position of the backsplash is obtained it is desirable to lock it in place. This locking action is provided by the screw member 54 that is installed through a screw opening 70 in the generally horizontal wall 38 of the backsplash 23, as is best seen in FIGURE 2. When the screw 54 is tightened it pulls the fastener 50 upwardly causing the spring fingers 64 to bind in place. One of the important advantages of the present invention is that the slidable fastener 50 is positively and rigidly mounted in the small opening 46 of the backsplash and thus the threaded opening 53 in the top end 52 of the fastener is perfectly aligned with the screw opening 70 such that the assembly worker can thread the screw 54 into the fastener and upon tightening the screw pulls up on the fastener 50 effects this desired locking action.

Modifications of this invention will occur to those skilled in this art, therefore, it is to be understood that this invention is not limited to the particular embodiments disclosed but that it is intended to cover all modifications which are within the true scope of this invention as claimed.

What I claim as new and desire to secure by Letters Patent of the United States is:

1. A cooking appliance adapted for installation in a space provided therefor in a counter having a horizontal working surface, comprising a rectangular cooking surface adapted to be secured in said space, said cooking surface having at least two spaced aligned parallel slots formed therein adjacent the rear thereof and extending in a front-to-rear direction, a hollow control housing formed to extend across the rear of said cooking surface and to be seated thereon, said housing having a pair of small openings formed in a bottom surface thereof to be in alignment with said slots respectively; the invention comprising a pair of snap-in fasteners respectively positioned through said openings in the housing and into said slot so as to be horizontally slidable in the slot, each said fastener having a resilient finger means engaging the underside of said cooking surface and shoulder means engaging the edge of the opening due to spring action of the finger means thereby forming a tight fit of the fastener in the housing, and screw means extending through the top of the housing and coupled with each said fastener for applying pressure to the fastener to lock it and the housing in place.

2. A cooking appliance as recited in claim 1 wherein each fastener is a formed sheet metal member having an elongated shank with a generally U-shaped bottom end facing upwardly where the bight of the U has a resilient finger integral with each opposite edge thereof, the lower end of the shank forming one leg of the U, there being a second or free leg which rises higher than the resilient fingers, both legs of the U having said shoulder means in substantially the same horizontal plane which limits the amount of fastener penetration in the opening in the bottom of the control housing to the U-shaped bottom end.

3. A cooking appliance as recited in claim 2 wherein the top end of each fastener is provided with a horizontal tab, there being a threaded opening in the tab for receiving the screw means extending through the top of the controls housing.

4. A slidable fastening means for adjustably connecting a first member to a second member, said first member having a thin wall with an elongated slot therein, the second member having walls forming a box-like housing, one wall of the second member being seated on the second member over the said slot, said one wall having a small opening in alignment with said slot, and a sheet metal fastener extending through said opening and into said slot, said fastener having resilient finger means engaging the underside of said first member and shoulder means engaging the edge of the said opening in the second member to fix the fastener in the opening of the second member while allowing the fastener to move lengthwise in the slots of the first member, the second member having a second wall opposite the said one wall and including a screw opening, screw means extending through the screw opening and adjustably connected to the fastener for applying a pulling force on the fastener to lock the fastener relative to the first member.

5. A slidable fastening means as recited in claim 4 wherein the sheet metal fastener has an elongated shank with a generally U-shaped bottom end facing upwardly, where the bight of the U has a resilient finger integral with each opposite edge thereof, the lower end of the shank forming one leg of the U and there being a second or free leg which extends higher than the resilient finger, the distal end of the free leg having a tab forming a shoulder for engaging the edge of the opening in the said one wall of the first member, the lower end of the shank also including a shoulder generally in the same horizontal plane as the shoulder of the free leg, whereby the fastener may be inserted into the second member and its lower end may be snapped through both the opening in the said one wall of the second member and the slot in the first member for holding the two members together.

6. A slidable fastening means as recited in claim 4 wherein the bottom end of the fastener is formed as an upwardly directed four-sided configuration, where two opposite sides are diverging resilient finger means for an interference fit in the slot of the first member, and the remaining two sides carry the shoulder means seated on the edge of the said opening in the second member.

References Cited

FOREIGN PATENTS 753,389  2/1967  Canada.

DONALD A. GRIFFIN, Primary Examiner

U.S. Cl. X.R.

126—211